United States Patent [19]

Robbins et al.

[11] Patent Number: 4,712,755

[45] Date of Patent: Dec. 15, 1987

[54] HOSE SUPPORT

[76] Inventors: Daniel T. Robbins; Melvin T. Stewart, both of 6728 Ben Ave., North Hollywood, Calif. 91606

[21] Appl. No.: 920,458

[22] Filed: Oct. 20, 1986

[51] Int. Cl.⁴ .............................................. F16L 3/00
[52] U.S. Cl. ....................................... 248/49; 248/80; 138/106
[58] Field of Search ................... 248/49, 80; 138/106, 138/108; 248/410

[56] References Cited

U.S. PATENT DOCUMENTS

| | | | |
|---|---|---|---|
| 2,978,840 | 4/1961 | Tatsch | 138/106 |
| 3,730,228 | 5/1973 | Gibbs, Sr. | 248/49 |
| 3,819,137 | 6/1974 | Smith | 248/49 |
| 4,102,523 | 7/1978 | Finnell | 248/49 |
| 4,125,237 | 11/1978 | Hagins | 138/106 |
| 4,180,102 | 12/1979 | Larkin | 138/106 |
| 4,194,711 | 3/1980 | Winton | 248/49 |
| 4,228,978 | 10/1980 | Rand | 248/49 |
| 4,403,758 | 9/1983 | Burt | 248/49 |

Primary Examiner—J. Franklin Foss
Assistant Examiner—Robert A. Olson
Attorney, Agent, or Firm—Roger A. Marrs

[57] ABSTRACT

Apparatus is disclosed herein for supporting a length of flexible, convoluted hose from an outlet on a motor vehicle or the like to a disposal inlet. The apparatus includes a pair of rails arranged in sliding relationship by a hook arrangment taking the form of a hooked cut-out folded over upon itself to define a retainer for receiving the peripheral edge of the other rail. A mounting bracket joins one end of the rail to the outlet and a clamp releasable secures the rail and bracket to the outlet. The mounting bracket includes support flanges which are angled disposed with respect to each other in order to accommodate hose support.

1 Claim, 6 Drawing Figures

HOSE SUPPORT

BACKGROUND OF THE INVENTION

1. Field of the Invention

The present invention relates to supporting apparatus for flexible hoses and, more particularly, to a novel support apparatus which is readily extendable to a desired length and which is rigid for supporting a flexible, convulated hose during a dumping or other waste type procedure.

2. Brief Description of the Prior Art

In the past, it has been the conventional practice to dump or empty internal storage tanks within a variety of recreational vehicles by temporarily attaching a discharge hose to a fitting on the outside of the vehicle and extending the hose to an inlet of a waste storage container or system. Although such a hose suitably conducts the contents of the storage tank to the inlet of the disposal system, several problems and difficulties have been encountered which are primarily due to the fact that the construction of the hose is substantially flexible and the sidewall of the hose is generally provided with a plurality of convolutions. Such a flexible and convoluted hose is extremely pliable and upon the conducting of waste products or the like through the hose, substantial pressures are developed which have a tendency to cause the hose to loop upon itself or to become distorted so that normal flow through the hose is impeded. Part of the problem also resides in the fact that the hose is unsupported from its extension from the outlet of the vehicle to the inlet of the disposal system. Since the hose is raised and unsupported above the surface of the ground, it does not require much pressure or undulation of the products passing through the hose to cause hose distortion and reduced flow.

Therefore, a longstanding need has existed to provide a novel apparatus for supporting the flexible and convoluted hose between the outlet of the vehicle and the inlet of the disposal system. Such an apparatus should have the ability to be extended or retracted to match the length of the hose and suitable means should be provided for releasably connecting the apparatus to the vehicle so that its support function can be carried out.

SUMMARY OF THE INVENTION

Accordingly, the above problems and difficulties are obviated by the present invention which provides a support apparatus comprising a pair of elongated rails of substantially U-shaped cross-section which are arranged in slidable relationship with respect to each other so as to provide for an adjustable overall length. Hook means are provided for slidably relating the pairs of rails together and in one form of the invention, each hook comprises a portion of material cut from the sidewall of each rail which is then folded over upon itself to provide a retainer through which the sidewall of the other rail can be inserted in slidable relationship. Also, a mounting bracket is included at one end of the rail assembly for releasable connection to the outlet on a recreational vehicle. Such an arrangement is for support purposes only whereby the rails hold and support the hose during a pumping or discharge operation. The bracket includes flanges which are arranged at an angular relationship with respect to one another so that a variety of angles can be accommodated wherein the hose is downwardly depending from the outlet to a disposal unit inlet which is substantially lower than the outlet.

Therefore, it is among the primary objects of the present invention to provide a novel apparatus for supporting a pliable and flexible hose during a pumping or discharge operation wherein the weight and the thin-wall construction of the hose is rigidly supported in order to prevent undesired kinking, looping or other hose distortion.

Another object of the present invention is to provide a novel support for a flexible hose which is of varying length so as to accommodate hoses of different lengths and which includes a detachable bracket means for supporting the end of the apparatus to an outlet.

Still another object of the present invention is to provide a novel hose support apparatus which is economical to manufacture, simple to install and that may be readily assembled and disassembled without tools or skill on behalf of the user.

Yet another object of the present invention is to provide a novel support for a flexible or pliable hose which may be readily assembled at the site during a pumping or discharge procedure and that may be readily disassembled and stored for future use.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
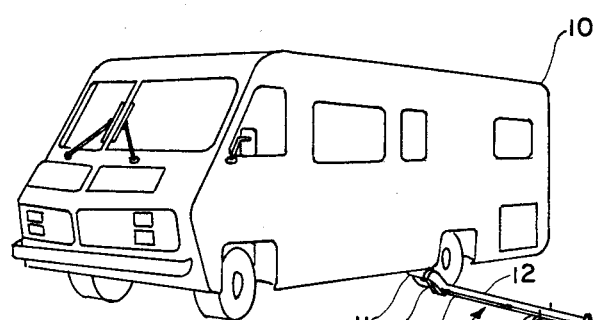
FIG. 1 is a perspective view of a recreational vehicle incorporating the novel hose supporting apparatus of the present invention.

Referring to FIG. 1, a conventional recreational vehicle is indicated by numeral 10 and as is the usual case, an outlet 11 is provided for the attachment of one end of a conventional flexible, convoluted hose 12. The opposite end of the hose is attached to an inlet 13 leading into a storage reservoir, sewage system or the like. When it is desired to discharge from a storage tank within the recreational vehicle 10, the user will activate whatever pumps are necessary and the contents of the tank within the vehicle will be passed through the hose 12 into the inlet 13. However, as noted above, problems and difficulties are normally encountered because the hose is flexible and has a tendency to distort during the pumping operation since the hose is normally unsupported. In accordance with the present invention, the hose 12 is supported by a hose support apparatus indicated in the general direction of arrow 14 which includes at least a pair of rails 15 and 16 which are arranged in sliding relationship so as to be selectively extended to a desired length depending on the length of the hose 12 to be supported. A mounting bracket 17 supports one end of the rail assembly to the outlet 11 while a clamp 18 releasably secures the bracket to the outlet.

Figure 2:
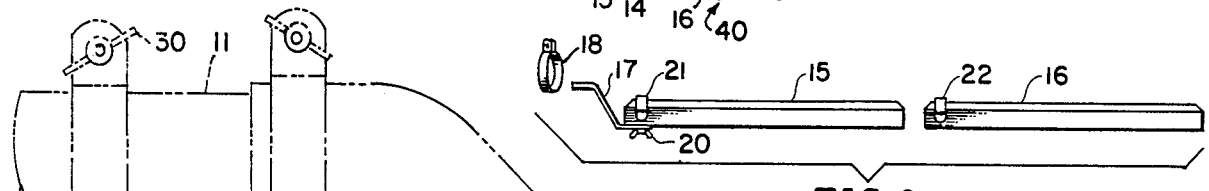
FIG. 2 is an exploded side elevational view of the components for the novel hose apparatus shown in FIG. 1.

Referring now in detail to FIG. 2, an exploded view of the hose support apparatus is illustrated wherein it can be seen that the rails 15 and 16 are identical in length, shape and configuration so that the rails may be mass produced on a common die or fixture setup. Also, the rail 15 is coupled to one end of the bracket 17 by means of a wing nut arrangement 20. A feature of the invention resides in arranging the rails in sliding relationship and to retain the rails together, a novel hook arrangement is employed and numeral 21 indicates the hook associated with rail 15 while numeral 22 indicates the hook carried on the end of rail 16. It is to be understood that additional rails may be added, if necessary, to accommodate longer lengths of hose.

Figure 3:
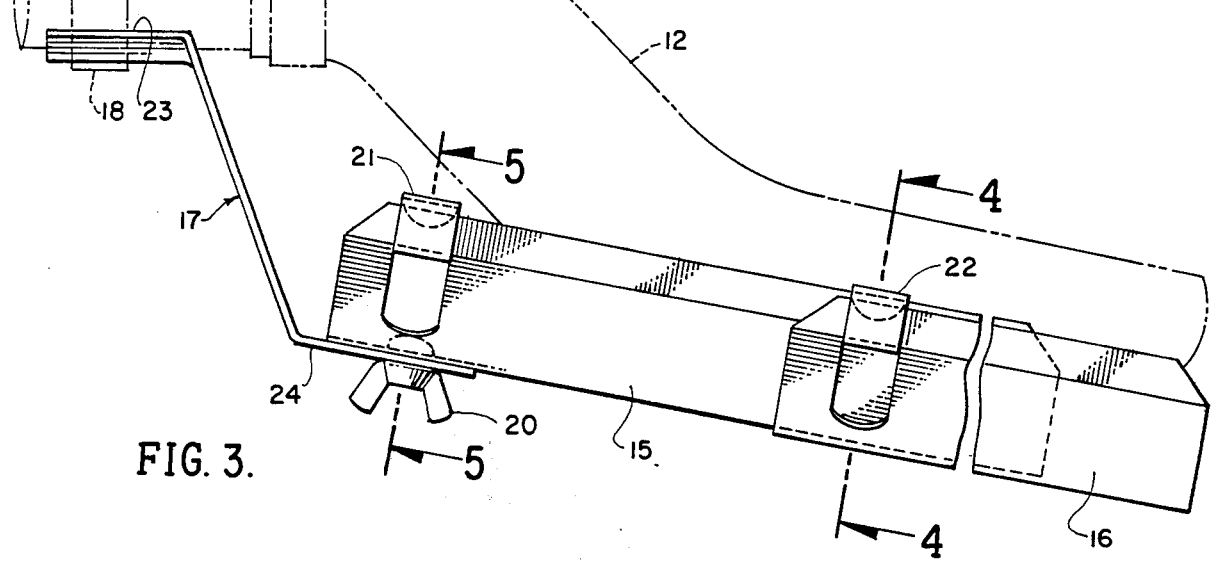
FIG. 3 is an enlarged side elevational view showing the hose support apparatus in an assembled condition for use in a pumping or discharge procedure.

Referring now in detail to FIG. 3, it can be seen that the bracket 17 includes a midsection having outwardly projecting flanges 23 and 24 carried on opposite ends of the midsection. The flanges extend outwardly in opposite directions to terminate in free ends and it is to be particularly noted that the flanges are angularly disposed with respect to each other. In other words, the flanges 23 and 24 are flat and extend along planes which are not parallel to each other. Flange 24 is provided with an opening for passing the wing nut 20 therethrough whereby the end of rail 15 can be secured to the flange 24. The clamp 18 extends about the end of outlet 11 and flange 23 as a unit so that the flange 23 is secured thereto. A feature of the invention resides in providing a flange with slightly raised sidewalls, as seen more clearly in FIG. 4 as represented by numerals 26 and 27 so that the flange will substantially conform to the circular configuration of the outlet 11. A wing nut or screw-type retainer 30 is employed for tightening or loosening the clamp 18 about the fitting and the mounting flange 23.

It is also noted in FIG. 3 that the rail 16 is arranged in sliding relationship with respect to rail 15 inasmuch as the rails are conformal in cross-sectional configuration and that the hook 22 associated with the end of rail 16 extends upwardly from the sidewall of rail 16 and is formed with a hook portion that passes over the upper edge of the sidewall of rail 15 in sliding relationship. The hook 22 is disposed above the top of the sidewall of rail 16 since the hook and the rail 16 must accommodate the placement of rail 15 in a nested relationship with rail 16 so that the edge marginal region of its upper sidewall will be captured by the hook 22.

Figure 4:
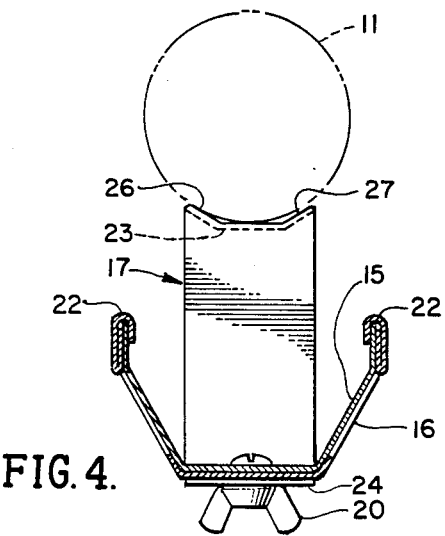
FIG. 4 is a transverse cross-sectional view of the hose apparatus taken in the direction of arrows 4—4 of FIG. 3.

Referring now in detail to FIG. 4, it can be seen that rail 14 is in conformal and sliding relationship with respect to rail 16. The hooks 22 are provided on each side of the sidewall of rail 16 so that a slight space exists within the confines of the hook to accommodate the thickness of the wall of rail 15.

Figure 5:
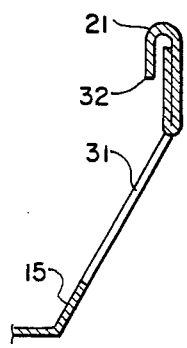
FIG. 5 is an enlarged sectional view taken in the direction of arrows 5—5 of FIG. 3.

Referring now in detail to FIG. 5, it can be seen that the novel hook, such as hook 21, is formed from the rail, such as rail 15, by providing a cutout 31 in the sidewall of the rail and bending or folding the cutout portion of the sidewall over upon itself so as to reside against the upper edge marginal region of the sidewall and being further folded or bent over to provide the hook portion as indicated by numeral 32. Therefore, each rail used in the hose apparatus of the present invention is identical and the hooks are provided from the same material and the same structure of the rail so as to be integral and to provide a unitary construction. It is also to be noted that each of the rails are of U-shape in cross-sectional configuration so that the rails will nest in conformal relationship when assembled together. This establishes a means for packaging and transporting the rails prior to use and permits the sliding relationship and linear arrangement of the rails with respect to one another when in use.

In normal usage, the hose 12 will reside within the hollow or cavity of the rails between the opposing surfaces of the sidewalls and against the bottom central section of the rail itself. Therefore, any pumping pressure or dense discharge through the hose which would normally cause distortion or kinking of the hose will be avoided since the sidewalls and bottom section of each rail will support and retain the hose in its intended configuration.

Figure 6:
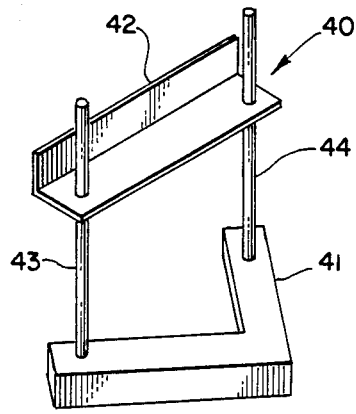
FIG. 6 is a perspective view of a self-adjusting prop or stantion for supporting the apparatus.

FIG. 6 shows a self-adjusting prop or stantion in the general direction of arrow 40. A U-shaped base 41 is formed from tube stock with mounting holes through which rods 43 and 44 are disposed in order to hold a channel bracket 42. The stantion may be used anywhere along the length of the rails which rest on top of the bracket 42. The bracket is adjustable in height with respect to the base 41 since the upper ends of rods 43 and 44 pass through holes in the bracket. Therefore, the bracket may be slid along the length of the rods to a desired height and the weight of the rails on the bracket will cause a binding of the bracket with the rods to retain the bracket in place.

While particular embodiments of the present invention have been shown and described, it will be obvious to those skilled in the art that changes and modifications may be made without departing from this invention in its broader aspects and, therefore, the aim in the appended claim is to cover all such changes and modifications as fall within the true spirit and scope of this invention.

What is claimed is:

1. In combination with a storage tank outlet and a disposal tank inlet with a flexible hose interconnecting said outlet with said inlet, the improvement which comprises:
    a pair of elongated rails having a flat bottom and opposite flat sidewalls arranged in sliding end-to-end relationship supporting said flexible hose;
    mounting means coupling one end of said pair of rails to said outlet at said hose interconnection;
    retainer means slidably connecting said pair of rails together so that said rails are co-extensive;
    said mounting means includes a bracket having a sloped central section with outwardly extending flanges at each of its opposite ends;
    said end flanges angularly disposed with respect to said central section;
    a clamp for detachably connecting a selected one of said bracket flanges to said hose coupled outlet;
    an adjustable fastener coupling the other of said bracket flanges to the terminating end of said rail;
    said retainer means includes hook means carried on the end of one rail slidably coupled to the other rail of said pair;
    each of said rails of said pair are identically configured with opposite sloping sidewalls connected by a flat bottom section wherein the distance between the opposing surfaces of said sidewalls at their top edge is greater than the distance between opposite sidewalls at the bottom section so that said hose is disposed between said sidewalls on said bottom section;

said other bracket flange mating the flat bottom section so that said bracket flange is pivotal about said adjustable fastener;

said retainer means are disposed on said sidewalls wherein each hook comprises an integral cut-out portion of said sidewall folded over upon itself to define a hook for slidably receiving said sidewall of the other sidewall of said pair;

a self-adjusting free-standing stanchion means disposed under said rails to support said rails and hose on the ground;

said stanchion means includes a V-base supporting a bracket on a pair of spaced apart rods, said bracket adapted to slide on said rods when free of weight thereon and being retained on said rods under weight of said rails and hose.

* * * * *